(12) United States Patent
Cahana et al.

(10) Patent No.: US 10,841,336 B2
(45) Date of Patent: Nov. 17, 2020

(54) SELECTIVELY PROVIDING MUTUAL TRANSPORT LAYER SECURITY USING ALTERNATIVE SERVER NAMES

(71) Applicant: International Business Machines Corporation, Armonk, NY (US)

(72) Inventors: Zvi Cahana, Nahariya (IL); Etai Lev-Ran, Nofit (IL); Idan Zach, Givat Ela (IL); Shriram Rajagopalan, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 15/984,423

(22) Filed: May 21, 2018

(65) Prior Publication Data

US 2019/0356693 A1  Nov. 21, 2019

(51) Int. Cl.
| | | |
|---|---|---|
| *H04L 29/06* | (2006.01) | |
| *H04L 12/24* | (2006.01) | |
| *G06F 21/53* | (2013.01) | |
| *H04L 29/08* | (2006.01) | |

(52) U.S. Cl.
CPC ............ *H04L 63/166* (2013.01); *G06F 21/53* (2013.01); *H04L 41/12* (2013.01); *H04L 63/0281* (2013.01); *H04L 63/0869* (2013.01); *G06F 2221/2149* (2013.01); *H04L 67/10* (2013.01)

(58) Field of Classification Search
CPC .............. H04L 63/166; H04L 63/0281; H04L 63/0869; H04L 41/12; G06F 21/53
See application file for complete search history.

(56) References Cited

U.S. PATENT DOCUMENTS

| 10,623,390 B1* | 4/2020 | Rosenhouse ........ H04L 67/1002 |
|---|---|---|
| 2015/0019559 A1* | 1/2015 | Maquaire ............. G06F 16/907 |
| | | 707/740 |
| 2019/0207912 A1* | 7/2019 | Nielson ................. H04L 9/0877 |
| 2019/0273746 A1* | 9/2019 | Coffing ................ H04L 63/105 |

FOREIGN PATENT DOCUMENTS

| WO | 2016192866 A1 | 12/2016 |
|---|---|---|
| WO | 2017205224 A1 | 11/2017 |

OTHER PUBLICATIONS

Kubernetes, io, "Kubelet Authentication/Authorization", https://kubernetes.io/, Reference Documentation, retrieved Mar. 28, 2018, 4 pages. https://kubernetes.io/docs/home/.

* cited by examiner

*Primary Examiner* — Ali S Abyaneh
*Assistant Examiner* — Shu Chun Gao
(74) *Attorney, Agent, or Firm* — Barry D. Blount (57) ABSTRACT

Examples of techniques for selectively providing mTLS using alternative server names are described herein. An example system includes a processor to generate an alternative server name in response to detecting a legacy indicator. The processor is to also associate the alternative server name with an address of a pod. The processor is to further configure a proxy associated with the pod to selectively provide mutual transport layer security (mTLS) based on the alternative server name.

19 Claims, 6 Drawing Sheets

FIG. 6

SELECTIVELY PROVIDING MUTUAL TRANSPORT LAYER SECURITY USING ALTERNATIVE SERVER NAMES

BACKGROUND

The present techniques relate to mutual transport layer security (mTLS). More specifically, the techniques relate to selectively providing mTLS using alternative server names.

SUMMARY

According to an embodiment described herein, a system may include processor to generate an alternative server name in response to detecting a legacy indicator and associate the alternative server name with an address of a pod. The processor may also further configure a proxy associated with the pod to selectively provide mutual transport layer security (mTLS) based on the alternative server name.

According to another embodiment described herein, a method may include detecting, via a processor, a legacy indicator. The method may further include modifying, via the processor, a uniform resource location (URL) of a pod to use an alternative server name. The method may also further include configuring a proxy associated with the pod to disable mutual transport layer security (mTLS) in response to receiving the alternative server name.

According to another embodiment described herein, a computer program product for selectively providing mutual transport layer security (mTLS) may include computer-readable storage medium having program code embodied therewith. The computer readable storage medium is not a transitory signal per se. The program code executable by a processor to cause the processor to monitor a plurality of manifests for a plurality of legacy indicators. The program code may also cause the processor to detect a legacy indicator associated with at least one legacy client in at least one of the plurality of manifests. The program code may also cause the processor to generate an alternative server name in response to detecting the legacy indicator. The program code may also cause the processor to associate the alternative server name with an address of a pod. The program code may also cause the processor to configure a proxy associated with the pod to disable a service in response to receiving a server name indicator comprising the alternative server name from a legacy client.

DETAILED DESCRIPTION

Microservice-based applications may be composed of multiple services, referred to herein as microservices, interacting using a network protocol. For example, the network protocol may be Hyper Text Transfer Protocol (HTTP), Hyper Text Transfer Protocol Secure (HTTPS), or based on a remote procedure call (RPC) system. In some examples, a microservice system may employ a service mesh. A service mesh may include components that communicate indirectly using intermediate proxies. These proxies may be used to simplify communication handling and may also improve communication resiliency and security. As long as communication between the services of a microservice-based application uses the proxies, the proxies can complete any prerequisites without impacting the microservice code directly. An example prerequisite may be a mutual transport layer security (mTLS) handshake. Mutual TLS, or mTLS, as used herein refers to a technique for performing mutual authentication between clients and servers. For example, a server may begin authentication of itself with a client by sending the client a certificate. The certificate may be signed by the trusted certificate authority and include the name of a server. The name may include a common name and an alternative name. The certificate 108 may also include a public key. The public key may be used by clients to encrypt a random value that is then decrypted by a server using a private key corresponding to the public key as proof of the server's identity to be sent back to the client. The client may then similarly authenticate itself with the server by performing a similar decryption of a value received from the server encrypted using a public key that corresponds to a private key of the client.

In service mesh environments, requests not initiated by a proxy, such as requests made by a legacy client, may also be intercepted and redirected to a proxy. As used herein, the term legacy client refers to clients that are not configured to use a particular prerequisite such as mTLS. Requests initiated by legacy clients may include health checks, access to metrics, status, introspection, and debug data requests. A health check may include a liveness check or a readiness check. Since the proxy may be unaware of the client's identity, the proxy may initiate an mTLS exchange. However, the resulting Client Certificate Request to begin authentication of the client may be unexpected by the legacy client and the connection may be consequently terminated. In some examples, a legacy client may perform a health check, such as a liveness check or a readiness check. For example, the legacy client may be used to check the liveness or readiness of an application instance in a pod. Liveness, as used herein, refers to whether an application instance is alive. For example, if a liveness check detects that an application instance is down, then an orchestrator may restart the application instance. An orchestrator, as used herein, refers to a container management tool that automates the provisioning of containerized infrastructure and provides load balancing for the services that containers are used to create. Readiness, as used herein, refers to whether an application instance is ready to serve traffic. For example, an application instance may be alive but not ready to serve traffic due to one or more dependencies not being ready. As used herein, a pod refers to a group of one or more processes, possibly running in a containerized environment, with a shared storage and network and a specification for how to run the one or more containers. A pod may thus be used to model an application-specific logical host. For example, the one or more containers in the pod may share an IP address and port space and may find each other via localhost. Each pod may be assigned a separate IP address to enable application instances to use ports without conflicts. A pod may be used to define a volume, such as a local disk directory or a network disk, and expose the volume to one or more containers in the pod. Applications within a pod may have access to shared volumes that may be defined as part of the pod and made available to be mounted into each application's filesystem. Pods may be managed manually via an orchestrator or via a controller, such as an admission controller.

According to embodiments of the present disclosure, a system may selectively provide mTLS using alternative server names. The system may include an alternative name generator to generate an alternative server name in response to detecting a legacy client and associate the alternative server name with an address of a pod. The system may also include a proxy configurator to configure a proxy associated with the pod to disable a service in response to receiving a server name indicator including the alternative server name.

Thus, the techniques described herein may enable legacy clients to be deployed in service mesh systems that use mTLS. Moreover, the techniques described herein are transparent to application instances and do not require any code changes in applications or clients. The techniques may be used to separate mTLS and non-mTLS clients into different logical servers, without impacting or changing client code.

In some scenarios, the techniques described herein may be implemented in a cloud computing environment. As discussed in more detail below in reference to at least FIGS. 3-5, a computing device configured to selectively provide mTLS using alternative server names may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

Figure 1:
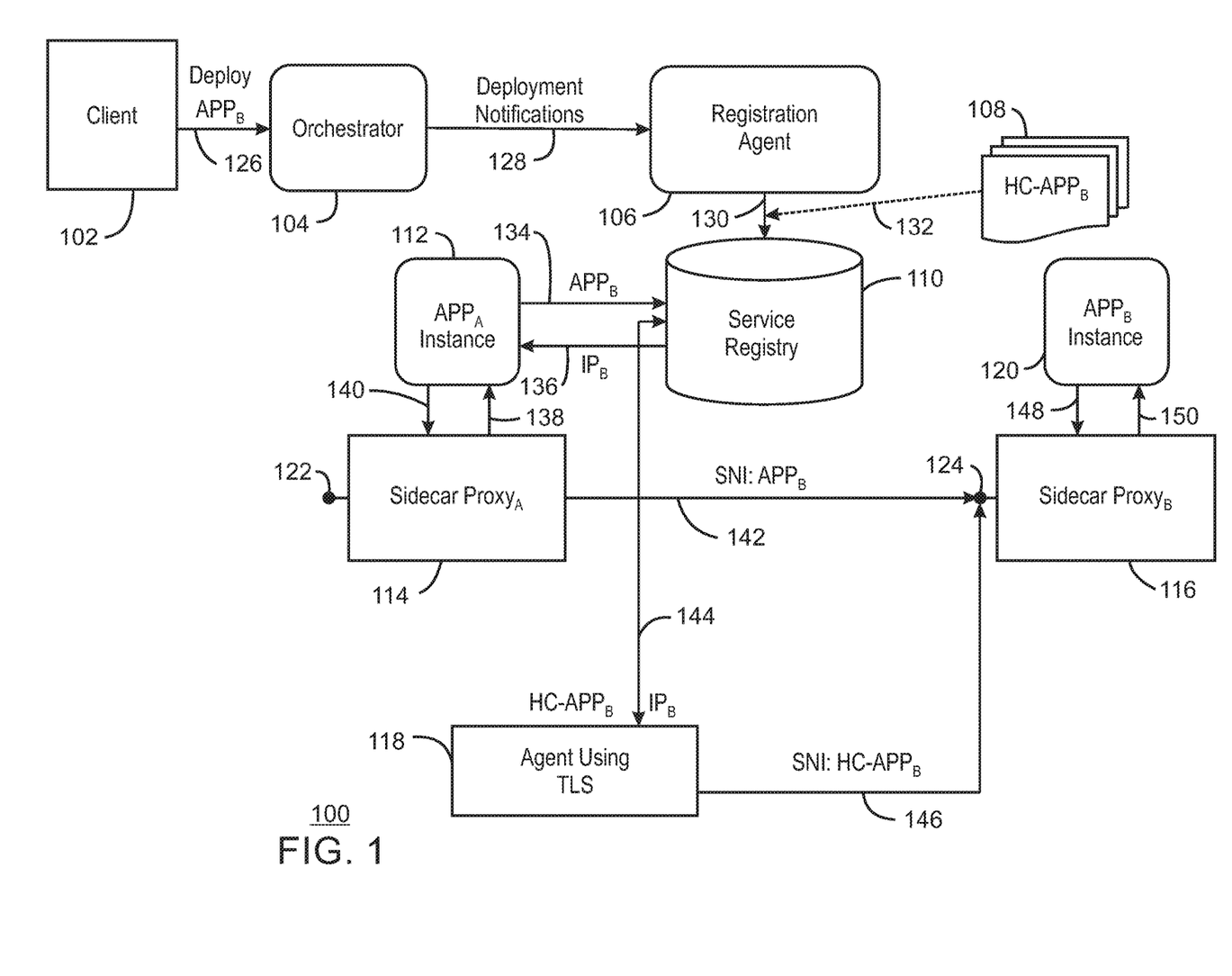
FIG. 1 is a block diagram of an example system for selectively providing mTLS using alternative server names.

With reference now to FIG. 1, a block diagram shows an example system for selectively providing mTLS using alternative server names. The example system is generally referred to by the reference number 100. For example, the system 100 may be a service mesh system. The system 100 of FIG. 1 includes a client 102 communicatively coupled to an orchestrator 104. For example, the client may be a user, a program, or an automated agent, such as an automated deployment pipeline. An orchestrator, as used herein, refers to a workload scheduling or orchestration system. The system 100 also includes a registration agent 106 communicatively coupled to the orchestrator 104. The system 100 includes an alternative name registration (HC-APP$_B$) 108 that may be registered by the registration agent 106 with a service registry 110. The registration agent 106 is accordingly also communicatively coupled to the service registry 110. The service registry 110 is further communicatively coupled to a first application instance 112. The first application instance 112 is communicatively coupled to a corresponding first sidecar proxy 114. As used herein, a sidecar proxy refers to a proxy that is associated with a particular application instance to provide one or more services of a service mesh for the application instance. The first sidecar proxy 114 is communicatively coupled to a second sidecar proxy 116. The service registry 110 and the second sidecar proxy 116 are communicatively coupled to an agent 118 using transport layer security (TLS). As used herein, TLS refers to a technique for a client to authenticate a server it is communicating with. For example, the agent 118 may belong to an orchestrator and may ensure that a workload that is scheduled to a particular endpoint or node is healthy. For example, the agent may check the health of different application instances and services that are running by pinging their health endpoints. The agent 118 may be a legacy client that is not configured to perform mTLS. The second sidecar proxy 116 is further communicatively coupled to a second application instance 120 corresponding to the second sidecar proxy 116. In some examples, the sidecar proxies 114 and 116 may be configured to perform mTLS. The sidecar proxies 114 and 116 may together form a service mesh. The sidecar proxies 114 and 116 may therefore be delegated one or more functions of the application instances 112 and 120, respectively. For example, the sidecar proxies 114 and 116 may determine how to load balance requests, how to handle failures, how to expose metrics about requests in a consistent way, among other functions such as reporting and logging. The sidecar proxies 114 and 116 include corresponding endpoints 122 and 124. For example, the endpoints 122 and 124 may be HTTP or HTTPS endpoints. Each of the endpoints 122 and 124 may have one or more names or identities. Each endpoint 122 or 124 may have multiple identifies associated with different purposes. For example, a name may be associated with liveness checks and another name may be associated with readiness checks. As described in greater detail below, one of the names may be an alternative server name that may be used to bypass mTLS during a health check. The endpoints 122 and 124 may also have a proof of the names or identities in the form of a certificates to be used for authentication.

In the example of FIG. 1, a client 102 may send a request to the orchestrator 104 to have a second application instance 120 deployed as shown by an arrow 126. In some examples, the request may be in the form of a manifest. As used herein, a manifest is a file that may specify a name, ports to be open, labels to be used, application image to be executed, and a number of instances to be executed, among other information. The manifest may be used by the orchestrator 104 to schedule, run, and manage one or more instances of an application. A manifest may be configured by a user for each workload to be managed. In some examples, the manifest may also include information on how to execute health checks for a workload. For example, the manifest may specify to execute liveness checks and readiness checks using alternative server names according to the example method of FIG. 2 below. The orchestrator 104 may send a set of deployment notifications to the registration agent 106 as shown by an arrow 128. The registration agent 106 may send an alternative server name 108 corresponding to a health check (HC) for the second application instance 120 to the service registry 110 as indicated by arrows 130 and 132. For example, the registration agent 106 may generate the alternative server name and register the alternative server name based on a manifest specifying the alternative server name that is to be registered for a particular service. In the example of FIG. 1, the alternative server name generated for a health check of the second application instance 120 is HC-APP$_B$. In some examples, the registration agent 106 may perform the alternative name registration 130 in response to a request from an extension hook. For example, the extension hook may be an admission controller, an extension API, or a control loop.

Still referring to FIG. 1, the first application instance 112 may send a server name APP$_B$ corresponding to the application instance 120 to the service registry 110 as shown by an arrow 134. The first application instance 112 may then receive an IP address IP$_B$ in response. The first sidecar proxy 114 may send a request for the IP address of the server with the name APP$_B$ of the second application instance 120 as indicated by an arrow 138. The first sidecar proxy 114 may then receive the IP address in response as shown by an arrow 140. The sidecar proxy 114 may then communicate with the second sidecar proxy 116 using the IP address IP$_B$. For example, the IP address may correspond to the endpoint 124 of the second sidecar 116 associated with the second application instance 120. The sidecar proxy 114 may send a server name indication (SNI) message of APP$_B$ to indicate to the second sidecar 116 that a normal communication using mTLS is to occur between the first sidecar proxy 114 and the second sidecar proxy 116. As used herein, an SNI is an extension to the TLS computer networking protocol by which a client indicates which hostname it is attempting to connect to at the start of a handshaking process. Using an SNI allows a server to present multiple certificates on the same IP address and TCP port number and hence allows multiple secure (HTTPS) websites (or any other Service over TLS) to be served by the same IP address without requiring all those sites to use the same certificate. Thus, when the second sidecar proxy 116 receives the SNI of APP$_B$, the second sidecar proxy 116 may be configured to perform a mutual TLS authentication with the first sidecar proxy 114. For example, the second sidecar proxy 116 may use a certificate corresponding to the particular SNI.

By contrast, the communication between the agent 118 and the second sidecar proxy 116 may not use mTLS. The agent 118 may instead use TLS to perform a health check on the second application instance 120. In some examples, the health check may be a liveness check used to determine whether an application instance is to be restarted. For example, the application instance may be in a deadlock in which the application instance is running but unable to make progress and therefore restarted. In some examples, the application instance may not be running and therefore be restarted. The health check may also be a readiness check to determine if an application instance is ready to serve a workload. Thus, the agent 118 may send a request for an IP of the second application instance 120 and receive the associated IP address as indicated by a double-ended arrow 144. For example, the agent may call the service registry 110 to resolve the name HC-APP$_B$ and receive an IP address IP$_B$ in response. The agent 118 may then send an SNI message of HC-APP$_B$ to indicate that mTLS is not to be used in communicating with the second sidecar proxy 116 as indicated by an arrow 146. For example, the alternative name may have been specified as a health check endpoint in a deployment YAML descriptor of a manifest. The SNI message may be sent in clear text form. In response to receiving the SNI of HC-APP$_B$, the second sidecar proxy 116 may be configured to only perform a TLS authentication rather than an mTLS authentication with the agent 118. In some examples, the second sidecar 116 may authenticate with the agent 118 using TLS and provide the agent 118 either a liveness status or readiness status. Thus, no Client Certificate Request may be sent to the agent 118, and a dropped connection may be avoided.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, applications, application instances, proxies, agents, registries, types of checks, etc. For example, the orchestrator may alternatively call out to an admission controller (not shown) that may be used to rewrite a deployment descriptor and change the original name with the alternative name where appropriate. For example, the admission controller may be used to change names to alternative names for liveness probes or readiness probes in pod. The admission controller may intercept requests to an API server of an orchestrator prior to persistence of an object, but after the request is authenticated and authorized. The admission controller may then inspect a received manifest. The admission controller may detect one or more services such as health checks in the manifest. The admission controller may then change a URL associated with a health check to use an alternative server name. For example, the admission controller may call one or more admission control webhooks that match the request. As used herein, a webhook refers to any callback or callout mechanism, such as a user-defined Hypertext Transfer Protocol (HTTP) callback. In some examples, an extension API (not shown) may be used to call a webhook. The webhook may be used to rewrite the deployment descriptor in the manifest to change the original name to an alternative name for liveness probes and readiness probes. The admission controller may then return the updated deployment descriptor to the orchestrator to create pods with health check endpoints associated with the alternative server name. In some examples, the manifest may be modified offline. For example, the manifest may be inspected and alternative server names injected into the manifest before the manifest is sent to the orchestrator 104. In some examples, a control loop (not shown) may be a program that monitors for change notifications in objects of interest and rewrites objects in response to detecting the change notifications. For example, the control loop may monitor the shared state of a cluster through an application programming interface (API) server of an orchestrator and make changes attempting to move the current state towards a desired state. The API server may provide notification of changes such as creations and deletions of various objects managed by an orchestrator. Unlike the admission controller that may be called by the orchestrator, a control loop may be reactive and process events as notifications.

Figure 2:
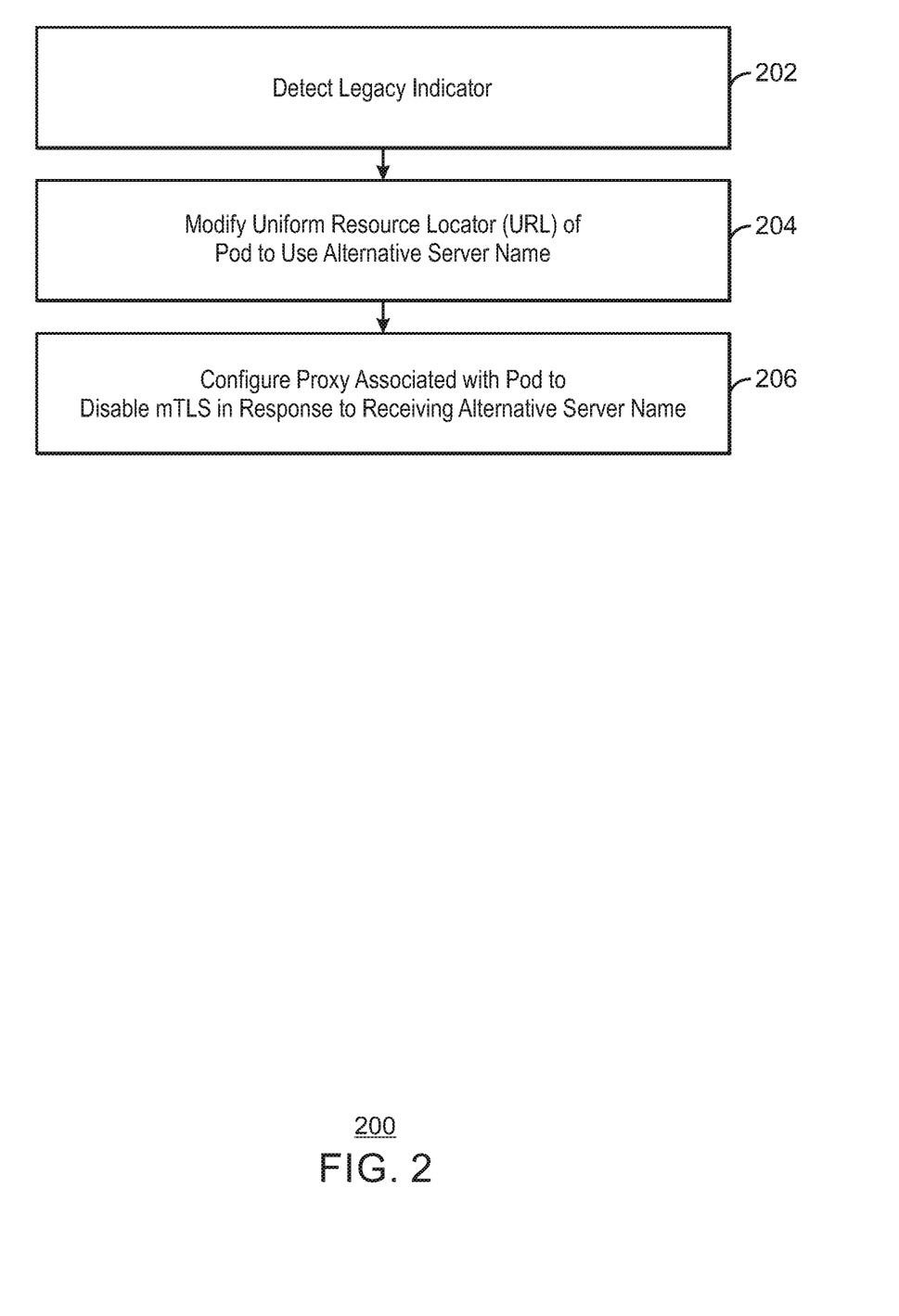
FIG. 2 is a block diagram of an example method that can selectively provide mTLS using alternative server names.

FIG. 2 is a process flow diagram of an example method that can selectively provide mTLS using alternative server names. The method 200 can be implemented with any suitable computing device, such as the computing device 300 of FIG. 3 and is described with reference to the systems 100 of FIG. 1. For example, the methods described below can be implemented by the processor 302 of the computing device 300 of FIG. 3.

At block 202, a legacy indicator is detected. As used herein, a legacy indicator refers to an indicator that a specific connection is not to use mTLS. In some examples, the legacy indicator may take the form of a specific attribute in a deployment manifest. For example, the manifest may specify one or more of a workload to be deployed. A workload may include any service that can be deployed by an application instance or a service, including web applications to more complex, distributed, back office processing systems. In some examples, the legacy indicator may be detected during deployment of an application. In some examples, a deployment can include different object types, including for example, "ReplicaSet", "Deployment", "Pod", etc. As described previously, a pod object may be one or more containers performing some function. In some examples, pods may be created directly. A ReplicaSet object may be used to dynamically set a number of pods running in a cluster. For example, the number of pods may be set based on a shared specification, such as an image to run, a configuration, open ports, etc. An orchestrator may be used to ensure that the object instances are running and handles any failures. Deployment objects may be used to add more functionality. For example, deployment objects may be used to enable rolling updates, etc. For example, the legacy indicator may be detected by an admission controller during deployment of a pod. In some examples, the legacy indicator may be detected via an extension application programming interface (API). For example, an admission controller may be used to call a webhook and send the manifest to the webhook to inspect and rewrite a manifest as described below. In some examples, the legacy indicator may be detected via a control loop. For example, the control loop may subscribe to change notifications and, in response to detecting a new workload, the control loop may modify a deployment descriptor of the new workload based on detected legacy indicators to match a desired state of using the alternative server name. In some examples, the legacy indicator may take the form of a URL in an explicit global deployment configuration providing container identity and respective legacy URLs. For example, the container identity may include an image name and labels. In some examples, the legacy indicator may take the form of explicitly added pod-specific metadata in labels or annotations. In some examples, the legacy indicator may be detected by running an image of a deployment in a sandbox environment and testing for existence of specific URL patterns including legacy indicators. In some examples, the legacy indicator may be detected by analyzing available API specifications for a legacy microservice. In this case, the legacy indicator may take the form of a specific legacy microservice being specified.

At block 204, a uniform resource locator (URL) of a pod is modified to use an alternative server name. For example, an admission controller may be used to change the URL of the pod to the alternative server name in the received manifest. The admission controller may call an admission webhook and send the manifest to be reconfigured. The admission controller may receive a manifest with updated URLs using alternative names for services such as health checks. In some examples, a mapping of the alternative server name to the pod may be stored in a service registry. In some examples, a collection of pods can be grouped into a service having a resolvable DNS name. When pods using non-mTLS connections are detected via the legacy indicator, the system may create an alternative name mapping to the same set of pods. For example, any arbitrary name for the alternative name may be used. In some examples, a service name may be used having different DNS resolution scope. For example, a health check namespace may be created and an alternative name may be created under the health check namespace with an explicit reference to the original service endpoint. In some examples, a specialized DNS server may be configured to resolve specially formatted alternative names such as healthcheck.<original_service_name> or no-mtls.<original_service_name>, where <original_service_name> is the original name of the service to be replaced with the specially formatted alternative name. Thus, as described above, the URLs may be automatically rewritten and presented in the manifest, enabling a fully transparent system modification without any user involvement.

At block 206, a proxy associated with the pod is configured to disable mutual transport layer security (mTLS) in response to receiving the alternative server name. For example, the proxy may be a sidecar proxy. The proxy may be configured to provide mTLS to some server names, but disable mTLS and use TLS instead in response to receiving an SNI including the alternative server name. Thus, the proxy may perform different support services for an application instance depending on the server name received. For example, a legacy client may thus be able to perform a health check using the alternative server name. For example, the health check may be a liveness check or a readiness check. The legacy client may send the alternative server name to a proxy configured to provide TLS in response to receiving the alternative server name. For example, the legacy client may send a server name indicator including the alternative server name to the proxy.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, other forms of legacy indicators may be used. Furthermore, in some examples, the proxy can be configured to use a different, non-standard port numbers for non-mTLS connections, leaving standard ports for use by mTLS connections. The proxy may create different listeners and may request a separate processing pipeline for each port. In addition, although the modification of URLs to include alternative names is described above as automatically performed without any user input, in some examples, the system can alternatively expose the alternative name as an attribute to allow users to configure other systems to use the alternative name. For example, the other system may be a centralized monitoring system. Moreover, in some examples, the alternative name can be used to reconfigure other systems components automatically. For example, if an original service name is exposed through an ingress resource, the system can create an additional ingress definition mapping the health check URL to the alternative service name. The ingress resource can be made specific to the health check URL and the original service name, changing only that mapping to the alternative internal service name while keeping the other URLS mapped to the original internal service name.

Figure 3:
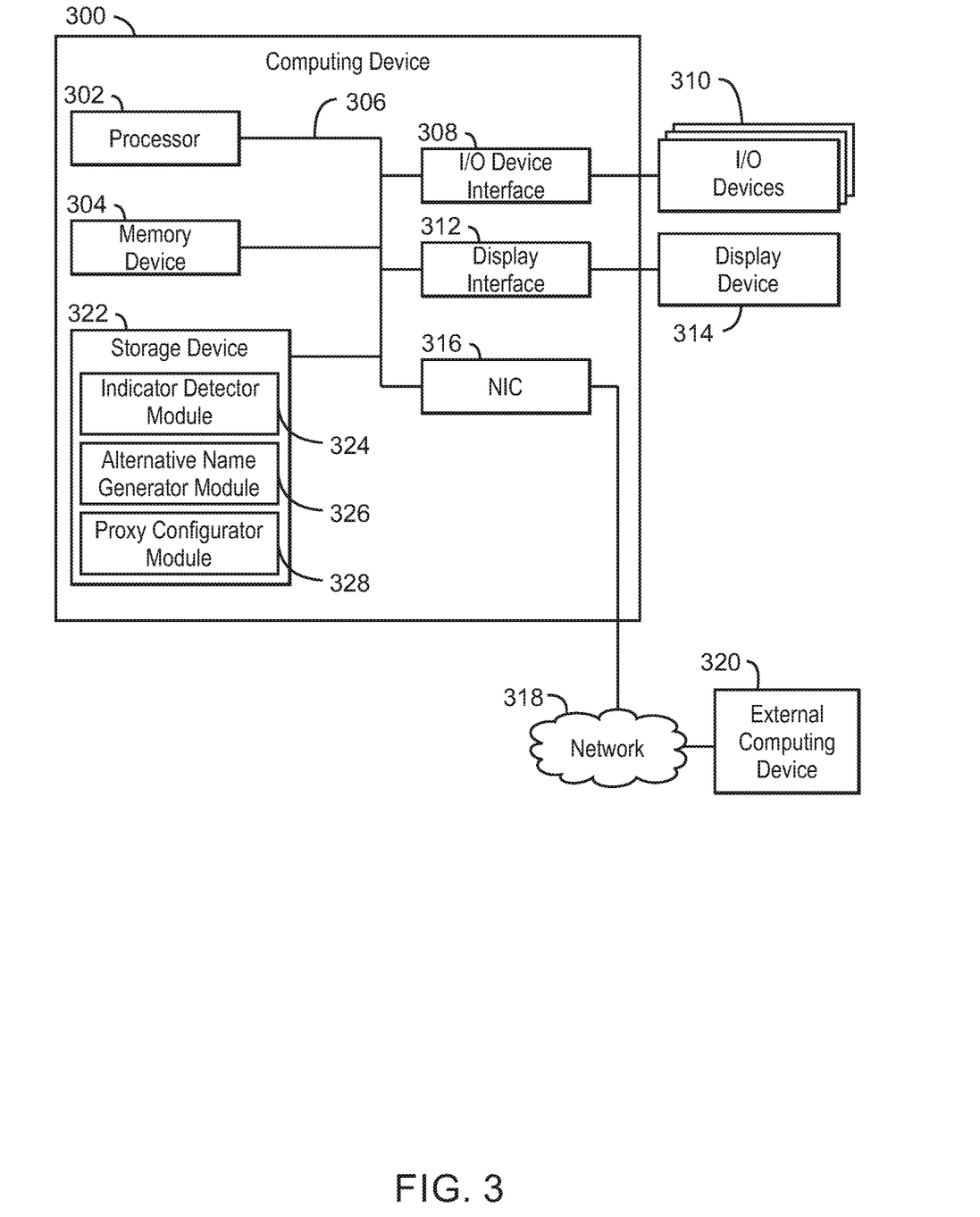
FIG. 3 is a block diagram of an example computing device that can selectively provide mTLS using alternative server names.

FIG. 3 is block diagram of an example computing device that can selectively provide mTLS using alternative server names. The computing device 300 may be for example, a server, desktop computer, laptop computer, tablet computer, or smartphone. In some examples, computing device 300 may be a cloud computing node. Computing device 300 may be described in the general context of computer system executable instructions, such as program modules, being executed by a computer system. Generally, program modules may include routines, programs, objects, components, logic, data structures, and so on that perform particular tasks or implement particular abstract data types. Computing device 300 may be practiced in distributed cloud computing environments where tasks are performed by remote processing devices that are linked through a communications network. In a distributed cloud computing environment, program modules may be located in both local and remote computer system storage media including memory storage devices.

The computing device 300 may include a processor 302 that is to execute stored instructions, a memory device 304 to provide temporary memory space for operations of said instructions during operation. The processor can be a single-core processor, multi-core processor, computing cluster, or any number of other configurations. The memory 304 can include random access memory (RAM), read only memory, flash memory, or any other suitable memory systems.

The processor 302 may be connected through a system interconnect 306 (e.g., PCI®, PCI-Express®, etc.) to an input/output (I/O) device interface 308 adapted to connect the computing device 300 to one or more I/O devices 310. The I/O devices 310 may include, for example, a keyboard and a pointing device, wherein the pointing device may include a touchpad or a touchscreen, among others. The I/O devices 310 may be built-in components of the computing device 300, or may be devices that are externally connected to the computing device 300.

The processor 302 may also be linked through the system interconnect 306 to a display interface 312 adapted to connect the computing device 300 to a display device 314. The display device 314 may include a display screen that is a built-in component of the computing device 300. The display device 314 may also include a computer monitor, television, or projector, among others, that is externally connected to the computing device 300. In addition, a network interface controller (NIC) 316 may be adapted to connect the computing device 300 through the system interconnect 306 to the network 318. In some embodiments, the NIC 316 can transmit data using any suitable interface or protocol, such as the internet small computer system interface, among others. The network 318 may be a cellular network, a radio network, a wide area network (WAN), a local area network (LAN), or the Internet, among others. An external computing device 320 may connect to the computing device 300 through the network 318. In some examples, external computing device 320 may be an external webserver 320. In some examples, external computing device 320 may be a cloud computing node.

The processor 302 may also be linked through the system interconnect 306 to a storage device 322 that can include a hard drive, an optical drive, a USB flash drive, an array of drives, or any combinations thereof. In some examples, the storage device may include an indicator detector module 324, an alternative name generator module 326, and a proxy configurator module 328. The indicator detector module 324 can detect a legacy indicator. For example, the indicator detector module 324 may receive a manifest and detect a legacy indicator in the manifest. The legacy indicator may be a specific attribute in a manifest, pod-specific metadata, a specific URL pattern generated by running an image of a deployment, or a legacy microservice in an application programming interface (API) specification, as discussed above. The legacy indicator may indicate the potential access of a legacy client. For example, the legacy client may be an agent that uses transport layer security (TLS) to perform a health check, or any other service. The alternative name generator module 326 may generate an alternative server name in response to detecting a legacy client. The alternative name generator module 326 may also associate the alternative server name with an address of a pod. For example, the pod may include an endpoint of a sidecar proxy. In some examples, the alternative name generator module 326 may modify a URL of the pod based on the alternative server name. The alternative name generator module 326 may be implemented via an admission controller, an extension API, or a control loop. The proxy configurator module 328 may configure a proxy associated with the pod to selectively provide a service based on the alternative server name. For example, configurator module 328 may configure the proxy associated with the pod to selectively disable a service in response to receiving a server name indicator including the alternative server name. As one example, the disabled service may be mTLS. The processor 302 can transmit data for an application instance or service using the configured proxy. In some examples, the processor 302 can provide services for an application instance using the configured proxy. For example, the processor can provide authentication services, such as mTLS or TLS services, using the configured proxy.

It is to be understood that the block diagram of FIG. 3 is not intended to indicate that the computing device 300 is to include all of the components shown in FIG. 3. Rather, the computing device 300 may include fewer or additional components not illustrated in FIG. 3 (e.g., additional memory components, embedded controllers, modules, additional network interfaces, etc.). Furthermore, any of the functionalities of the indicator detector module 324, the alternative name generator module 326, and the proxy configurator module 328 may be partially, or entirely, implemented in hardware and/or in the processor 302. For example, the functionality may be implemented with an application specific integrated circuit, logic implemented in an embedded controller, or in logic implemented in the processor 302, among others. In some embodiments, the functionalities of the indicator detector module 324, alternative name generator module 326, and proxy configurator module 328 may be implemented with logic, wherein the logic, as referred to herein, may include any suitable hardware (e.g., a processor, among others), software (e.g., an application, among others), firmware, or any suitable combination of hardware, software, and firmware. As one example, the functionalities of the indicator detector module 324, alternative name generator module 326, and proxy configurator module 328 may be implemented in an extension hook. For example, the extension hook may be an admission controller, an extension API server, or a control loop. An admission controller may inspect and modify a manifest before the pod is generated. For example, the admission controller may call one or more admission control webhooks that match the request. The webhooks may rewrite the deployment descriptor in the manifest to change the original name to an alternative name for liveness probes and readiness probes. An extension API server may call an admission hook. For example, the extension API server may receive a workload, call an extension point with the received workload, and receive a modified deployment descriptor including at least one uniform resource locator (URL) using the alternative server name. The control loop may monitor the shared state of a cluster through an API server of an orchestrator and make changes attempting to move the current state towards a desired state. For example, the control loop may subscribe to change notifications and, in response to detecting a new workload, modify a deployment descriptor of the new workload to match a desired state of using the alternative server name.

Figure 4:
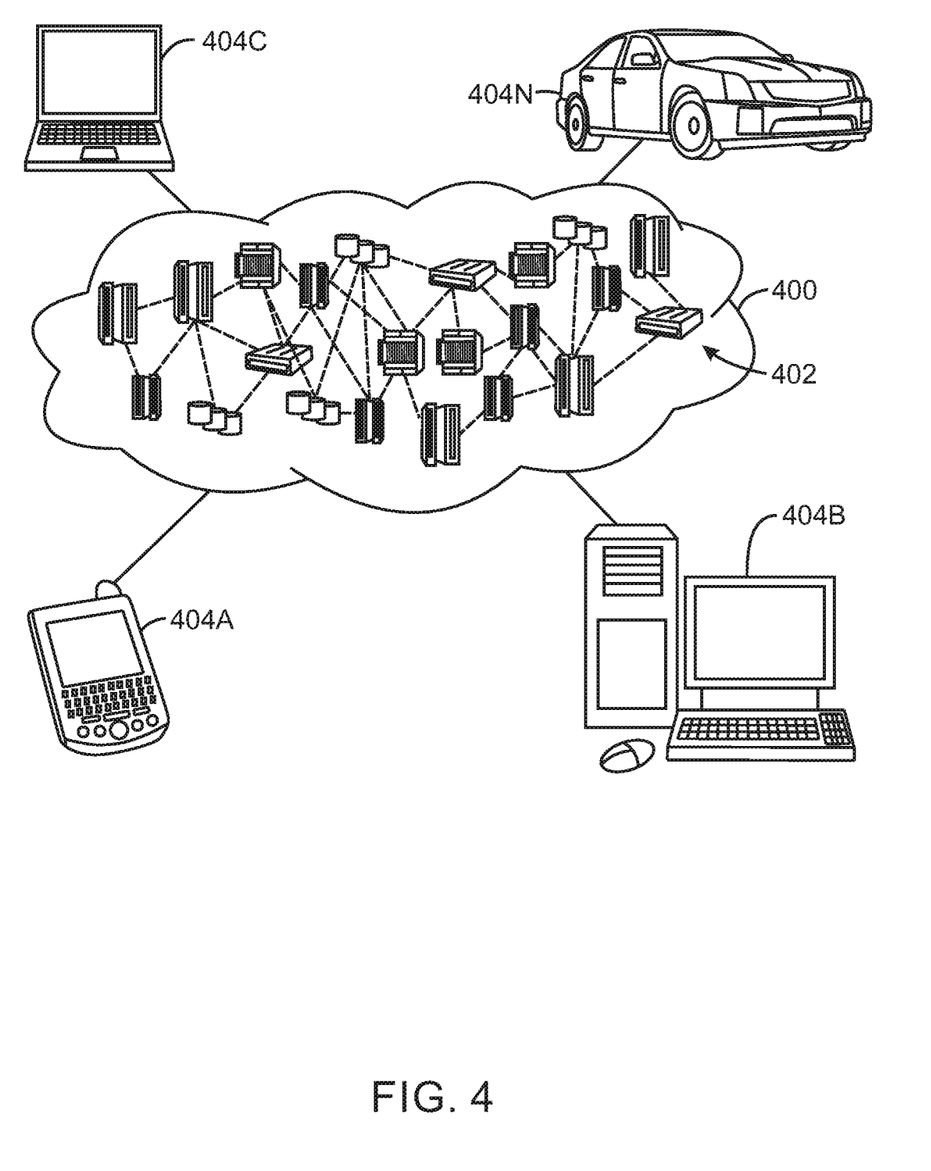
FIG. 4 is a process flow diagram of an example cloud computing environment according to embodiments described herein.

Referring now to FIG. 4, illustrative cloud computing environment 400 is depicted. As shown, cloud computing environment 400 includes one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 may communicate with any type of computerized device over any type of network and/or network addressable connection (e.g., using a web browser).

Figure 5:
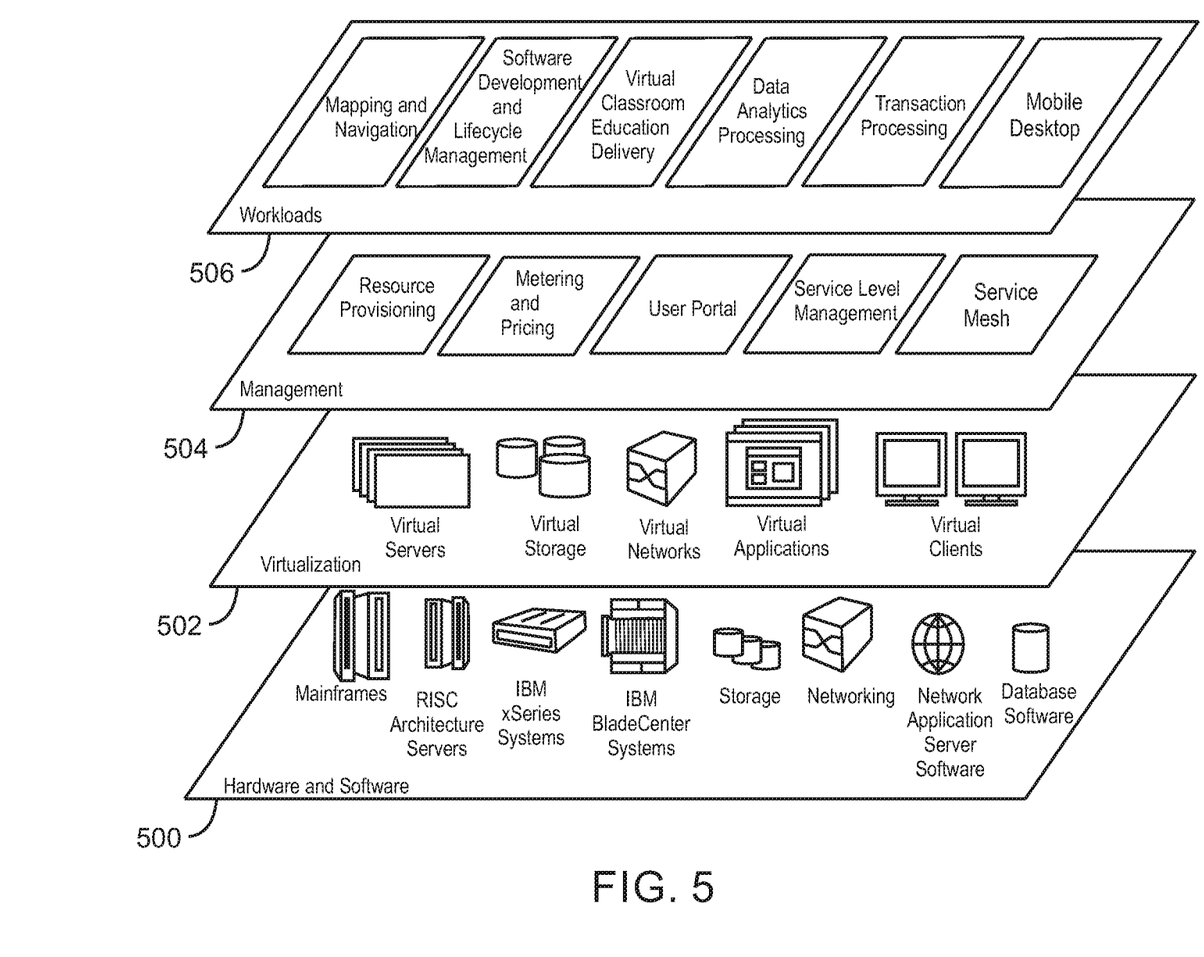
FIG. 5 is a process flow diagram of an example abstraction model layers according to embodiments described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 500 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 502 provides an abstraction layer from which the following examples of virtual entities may be provided: virtual servers; virtual storage; virtual networks, including virtual private networks; virtual applications and operating systems; and virtual clients. In one example, management layer 504 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security (not shown) provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment (not shown) provide pre-arrangement for, and procurement of, cloud computing resources for which a future requirement is anticipated in accordance with an SLA. Service mesh provides infrastructure services such as routing, security, and metrics.

Workloads layer 506 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The present techniques may be a system, a method or computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
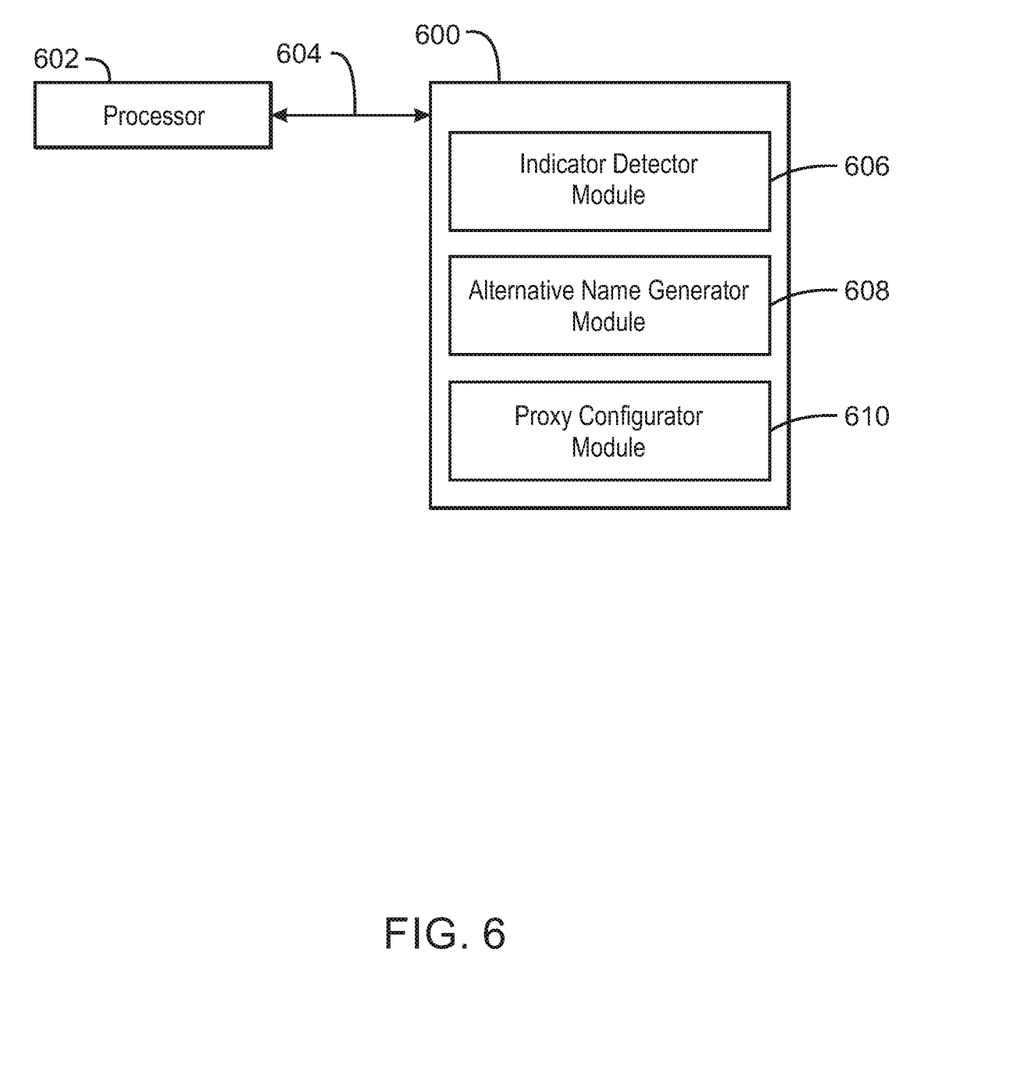
FIG. 6 is an example tangible, non-transitory computer-readable medium that can selectively provide mTLS using alternative server names.

Referring now to FIG. 6, a block diagram is depicted of an example tangible, non-transitory computer-readable medium 600 that can selectively provide mTLS using alternative server names. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the method 200 of FIG. 2 above.

The various software components discussed herein may be stored on the tangible, non-transitory, computer-readable medium 600, as indicated in FIG. 6. For example, an indicator detector module 606 includes code to monitor manifests for legacy indicators. The indicator detector module 606 also includes code to detect a legacy indicator associated with a legacy client in a manifest. In some examples, the indicator detector module 606 also may include code to inspect and modify a manifest before the pod is generated. In some examples, the indicator detector module 606 also may include code to detect the legacy indicator during a deployment of an application. An alternative name generator module 608 includes code to generate an alternative server name in response to detecting the legacy indicator. The alternative name generator module 608 also includes code to associate the alternative server name with an address of a pod. In some examples, alternative name generator module 608 also includes code to the store a mapping of the alternative server name to the pod in a service registry. A proxy configurator module 610 includes code to configure a proxy associated with the pod to disable a service in response to receiving a server name indicator including the alternative server name from the legacy client. For example, the proxy configurator module 610 may include code to configure the proxy to disable a mutual transport layer security (mTLS) in response to receiving the server name indicator including the alternative server name from a legacy client. In some examples, the proxy configurator module 610 may include code to configure the proxy to provide an alternative service in response to receiving the server name indicator comprising the alternative server name from the legacy client. For example, the proxy configurator module 610 may include code to configure the proxy to provide TLS in response to receiving the server name indicator including the alternative server name from the legacy client. In some examples, the legacy client may perform a health check on an application instance associated with the proxy using the alternative server name. For example, the health check may be a liveness check or a readiness check. It is to be understood that any number of additional software components not shown in FIG. 6 may be included within the tangible, non-transitory, computer-readable medium 600, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions. It is to be understood that any number of additional software components not shown in FIG. 6 may be included within the tangible, non-transitory, computer-readable medium 600, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a hardware processor configured to:
   generate an alternative server name in response to detecting a legacy indicator and associate the alternative server name with an address of a pod; and
   configure a proxy associated with the pod to selectively provide mutual transport layer security (mTLS) based on the alternative server name,
   wherein the system comprises an extension application programming interface (API) server to receive a workload, call an extension point with the received workload, and receive a modified deployment descriptor comprising at least one uniform resource locator (URL) using the alternative server name; and
   wherein the legacy indicator is an indicator that a specific connection is not to use mTLS.

2. The system of claim 1, wherein the system comprises an admission controller to inspect and modify a manifest before the pod is generated.

3. The system of claim 1, wherein the system comprises a control loop to subscribe to change notifications and, in response to detecting a new workload, modifying a deployment descriptor of the new workload to match a desired state of using the alternative server name.

4. The system of claim 1, wherein the legacy indicator comprises a specific attribute in a manifest, pod-specific metadata, a specific URL pattern generated by running an image of a deployment, or a legacy microservice in an application programming interface (API) specification.

5. The system of claim 1, wherein a legacy client associated with a detected legacy client access comprises an agent that uses transport layer security (TLS) to perform a health check.

6. The system of claim 1, wherein the hardware processor is to provide services for an application instance in the pod using the configured proxy.

7. A computer-implemented method, comprising:
   detecting, via a processor, a legacy indicator;
   modifying, via the processor, a uniform resource location (URL) of a pod to use an alternative server name;
   generating the alternative server name in response to detecting the legacy indicator and associating the alternative server name with an address of the pod; and
   configuring a proxy associated with the pod to disable mutual transport layer security (mTLS) in response to receiving the alternative server name,
   wherein the legacy indicator is an indicator that a specific connection is not to use mTLS.

8. The computer-implemented method of claim 7, wherein detecting the legacy indicator comprises receiving a manifest and sending the manifest to a webhook for inspection.

9. The computer-implemented method of claim 7, wherein detecting the legacy indicator comprises subscribing to change notifications detecting a new workload comprising the legacy indicator.

10. The computer-implemented method of claim 7, wherein detecting the legacy indicator comprises running an image of a deployment in a sandbox environment and testing for existence of a specific URL pattern comprising the legacy indicator.

11. The computer-implemented method of claim 7, wherein modifying the URL comprises rewriting a manifest via a webhook.

12. The computer-implemented method of claim 7, comprising exposing the alternative server name as an attribute to configure other systems to use the alternative server name.

13. The computer-implemented method of claim 7, comprising reconfiguring another system component automatically using the alternative server name.

14. A computer program product for selectively providing mutual transport layer security (mTLS), the computer program product comprising a computer-readable storage medium having program code embodied therewith, wherein the computer-readable storage medium is not a transitory signal per se, the program code executable by a processor to cause the processor to:

monitor a plurality of manifests for a plurality of legacy indicators;

detect a legacy indicator associated with at least one legacy client in at least one of the plurality of manifests;

generate an alternative server name in response to detecting the legacy indicator;

associate the alternative server name with an address of a pod; and configure a proxy associated with the pod to disable a service in response to receiving a server name indicator comprising the alternative server name from the at least one legacy client, wherein the legacy indicator is an indicator that a specific connection is not to use mTLS.

15. The computer program product of claim 14, further comprising program code executable by the processor to inspect and modify a manifest before the pod is generated.

16. The computer program product of claim 14, further comprising program code executable by the processor to detect the legacy indicator during a deployment of an application.

17. The computer program product of claim 14, further comprising program code executable by the processor to store a mapping of the alternative server name to the pod in a service registry.

18. The computer program product of claim 14, further comprising program code executable by the processor to configure the proxy to provide transport layer security (TLS) in response to receiving the server name indicator comprising the alternative server name from the legacy client.

19. The computer program product of claim 14, further comprising program code executable by the processor to configure the proxy to disable the mTLS in response to receiving the server name indicator comprising the alternative server name.

* * * * *